(12) United States Patent
Brock et al.

(10) Patent No.: US 6,918,309 B2
(45) Date of Patent: Jul. 19, 2005

(54) SAMPLE DEPOSITION METHOD AND SYSTEM

(75) Inventors: Ansgar Brock, San Diego, CA (US); Christopher M. Shaw, San Diego, CA (US); Robert C. Downs, La Jolla, CA (US)

(73) Assignee: IRM LLC

( * ) Notice: Subject to any disclaimer, the term of this patent is extended or adjusted under 35 U.S.C. 154(b) by 79 days.

(21) Appl. No.: 09/765,207

(22) Filed: Jan. 17, 2001

(65) Prior Publication Data

US 2002/0092366 A1 Jul. 18, 2002

(51) Int. Cl.[7] .............................. G01N 1/14; B01L 3/02
(52) U.S. Cl. ..................... 73/863.32; 73/61.55; 222/420
(58) Field of Search .............................. 73/863–863.03, 73/863.31–863.32, 23.41, 61.55, 864.01, 864.25, 23.37; 101/489, DIG. 37; 422/100, 950; 436/180; 137/2, 807, 825, 829; 141/31; 250/288; 347/55; 222/420

(56) References Cited

U.S. PATENT DOCUMENTS

| | | | | |
|---|---|---|---|---|
| 3,476,291 A | * | 11/1969 | Glaser ..................... | 222/420 X |
| 3,661,304 A | * | 5/1972 | Martinez et al. ........ | 222/420 X |
| 3,941,312 A | * | 3/1976 | Ohno et al. .............. | 347/55 X |
| 5,776,359 A | * | 7/1998 | Schultz et al. ............. | 423/623 |
| 5,879,949 A | * | 3/1999 | Cole et al. ............. | 422/100 X |
| 5,916,524 A | * | 6/1999 | Tisone ................. | 73/864.25 X |
| 6,040,193 A | * | 3/2000 | Winkler et al. ............... | 73/863 |
| 6,132,582 A | * | 10/2000 | King et al. ............. | 422/100 X |
| 6,149,787 A | * | 11/2000 | Chow et al. ......... | 73/864.02 X |
| 6,149,815 A | * | 11/2000 | Sauter .................... | 422/100 X |
| 6,191,418 B1 | * | 2/2001 | Hindsgaul et al. .......... | 250/288 |
| 6,231,739 B1 | * | 5/2001 | Nordman et al. ....... | 422/100 X |
| 6,350,617 B1 | * | 2/2002 | Hindsgaul et al. ...... | 422/100 X |
| 6,657,191 B2 | * | 12/2003 | Pork .......................... | 250/288 |
| 2001/0049148 A1 | * | 12/2001 | Wolk et al. .................. | 436/180 |
| 2002/0003177 A1 | | 1/2002 | O'Connor .................... | 239/696 |
| 2004/0227072 A1 | * | 11/2004 | Park ........................... | 250/288 |

FOREIGN PATENT DOCUMENTS

| | | | | |
|---|---|---|---|---|
| DE | 4229005 A1 | * | 3/1994 | ........... G01F/15/00 |
| DE | 19503634 A1 | * | 10/1995 | ............ B05B/1/02 |
| EP | 24230 | * | 2/1981 | ............ B01L/3/02 |
| GB | 2332273 A | * | 6/1999 | ............ G01N/1/28 |
| WO | WO 97/01085 | * | 1/1997 | ............ G01N/1/10 |
| WO | WO 99/29497 | * | 6/1999 | ............ B32B/3/00 |

OTHER PUBLICATIONS

Schuerenberg, "Prestructured MALDI–MS Sample Supports," Anal. Chem. 72: 3436–3442 (Aug. 2000).

Onnerfjord, "Picoliter Sample Preparation in MALDI–TOF MS Using a Micromachined Silicon Flow–Through Dispenser," Anal. Chem. 70: 4755–4760 (Nov. 1998).

Preisler, "On–Line MALDI–TOF MS Using a Continuous Vacuum Deposition Interface," Anal. Chem. 70: 5278–5287 (Dec. 1998).

Laurell, "Silicon Microstructures for High–Speed and High–Sensitivity Protein Identifications," J of Chromatography B. 752: 217–232 (2001), month not given.

(Continued)

*Primary Examiner*—Thomas P. Noland
(74) *Attorney, Agent, or Firm*—Timothy L. Smith

(57) ABSTRACT

A method and system to deposit rapidly, accurately and efficiently liquid droplets onto a sample plate. A liquid from which the droplet is formed contains sample molecules, matrix molecules or a mixture of both sample and matrix molecules. A sample plate is positioned with respect to a position below a portion of the liquid, such as a droplet. A power supply forms an electric field between the sample plate and the liquid, which pulls the droplet to a target location on the sample plate. A plurality of capillary columns is provided for simultaneous or successive multiple depositions via application of one or more high voltage pulses between the liquid sample array and a sample plate.

19 Claims, 6 Drawing Sheets

OTHER PUBLICATIONS

Miliotis, "Protein Identification Platform Utilizing Micro Dispensing Technology Interfaced to Matrix–Assisted Laser Desorption Ionization Time–of–Flight Mass Spectrometry," J of Chromatography A. 886:99–110, post (Apr. 13, 2000).

Miliotis, "Capillary Liquid Chromatography Interfaced to Matrix–Assisted Laser Desorption/Ionization Time–of–Flight Mass Spectrometry Using an On–Line Coupled Piezoelectric Flow–Through Microdispenser," J of Mass Spectrom. 35:369–377 (2000), month not given.

Laurell, "Proteomics–Protein Profiling Technology: The Trend Towards a Microfabricated Toolbox Concept," Trends in Analytical Chemistry. 20:225–231 (2001), month not given.

Yogi, "On–Demand Droplet Spotter for Preparing Pico–to–Femtoliter Droplets on Surfaces," Anal. Chem. 73:1896–1902 (Apr. 2001).

DeVault, "Electrofilament Deposition and Off–Column Detection of Analytes Seperated by Capillary Electrophoresis," Electrophoresis. 21:1320–1328 (2000), month not given.

Preisler, "Capillary Electrophoresis–Matrix–Assisted Laser Desorption/Ionization Time–of–Flight Mass Spectrometry Using a Vaccuum Deposition Interface," Anal. Chem. 72:4785–4795 (Oct. 2000).

Johnson, "A CE–MALDI Interface Based on the Use of Prestructured Sample Supports," Anal. Chem. 73:1670–1675 (Apr. 2001).

Hager, "Droplet Electrospray Mass Spectrometry," Anal. Chem. 66:3944–3949 (Nov. 1994).

Ojima, "Droplet Electrocoupling Between Capillary Electrophoresis and Matrix Assisted Laser Desorption/Ionization–Time of Flight–Mass Spectroscopy and its Application," Electrophoresis. 22:3478–3482, (2001), post Jan.

Miliotis, "Development of Silicon Microstructures and Thin–Film MALDI Target Plates for Automated Proteomics Sample Identification," J of Neuroscience Methods. 109:41–46 (2001), month not given.

Laurell, "Microfluidic Components for Protein Characterization," Reviews in Molecular Biotechnology. 82:161–175 (2001), month not given.

Marko–Varga, "Disposable Polymeric High–Density Nanovial Arrays for Matrix Assisted Laser Desorption/Ionization–Time of Flight–Mass Spectrometry:I. Microstructure Development and Manufacturing,"Electrophoresis. 22:3978–3983 (2001), post Apr.

Miliotis, "Ready–Made Matrix–Assisted Laser Desorption/ Ionization Target Plates Coated with Thin Matrix Layer for Automated Sample Deposition in High–Density Array Format," Rapid Commun. Mass Spectrom. 16:117–126 (2002), by Jun.

Ekstrom, "Signal Amplification Using "Spot–on–a–Chip" Technology for the Identification of Proteins via MALDI–TOF MS," Anal. Chem. 73:214–219 (Jan. 15, 2001).

Ericsson, "Downsizing Proteolytic Digestion and Analysis Using Dispenser–Aided Sample Handling and Nanovial Matrix–Assisted Laser/Desorption Ionization—Target Arrays," Proteomics. 1:1072–1081 (2001), post Jan.

Ekstrom, "Disposable Polymeric High–Density Nanovial Arrays for Matrix Assisted Laser Desorption/Ionization–Time of Flight–Mass Spectrometry: II. Biological Applications," Electrophoresis. 22:3984–3992 (2001), post Apr.

Morozov, "Electrospray Deposition as a Method for Mass Fabrication of Mono–and Multicomponent Microarrays of Biological and Biologically Active Substances," Anal. Chem. 71:3110–3117 (Aug. 1999).

Lemmo, "Characterization of an Inkjet Chemical Microdispenser for Combinatorial Library Synthesis," Anal. Chem. 69:543–551 (Feb. 1997).

Miliotis, "Analysis of Regulatory Phosphorylation Sites in ZAP–70 by Capillary High–Performance Liquid Chromatography Coupled to Electrospray Ionization or Matrix–Assisted Laser Desorption Ionization or Matrix–Assisted Laser Deorption Ionization Time–of–Flight Mass Spectrometry," J of Chromatography B, 752:323–334 (2001), month not given.

Ekstrom, "Integrated Microanalytical Technology Enabling Rapid and Automated Protein Identification," Anal. Chem. 72:286–293 (Jan. 15, 2000).

Onnerfjord, "Homogeneous Sample Preparation for Automated High Throughput Analysis with Matrix–Assisted Laser Desorption/Ionisation Time–of–Flight Mass Spectrometry," Rapid Commun. Mass Spectrom. 13: 315–322 (1999), month not given.

* cited by examiner

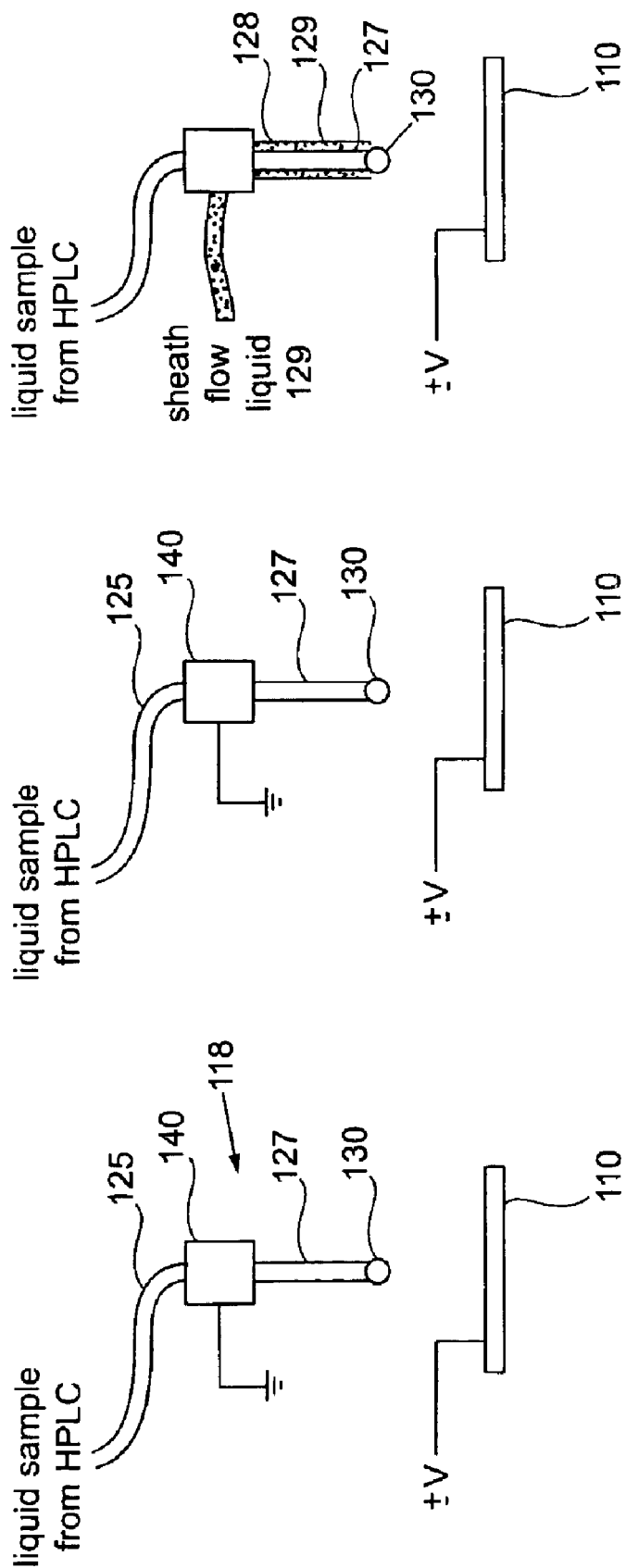

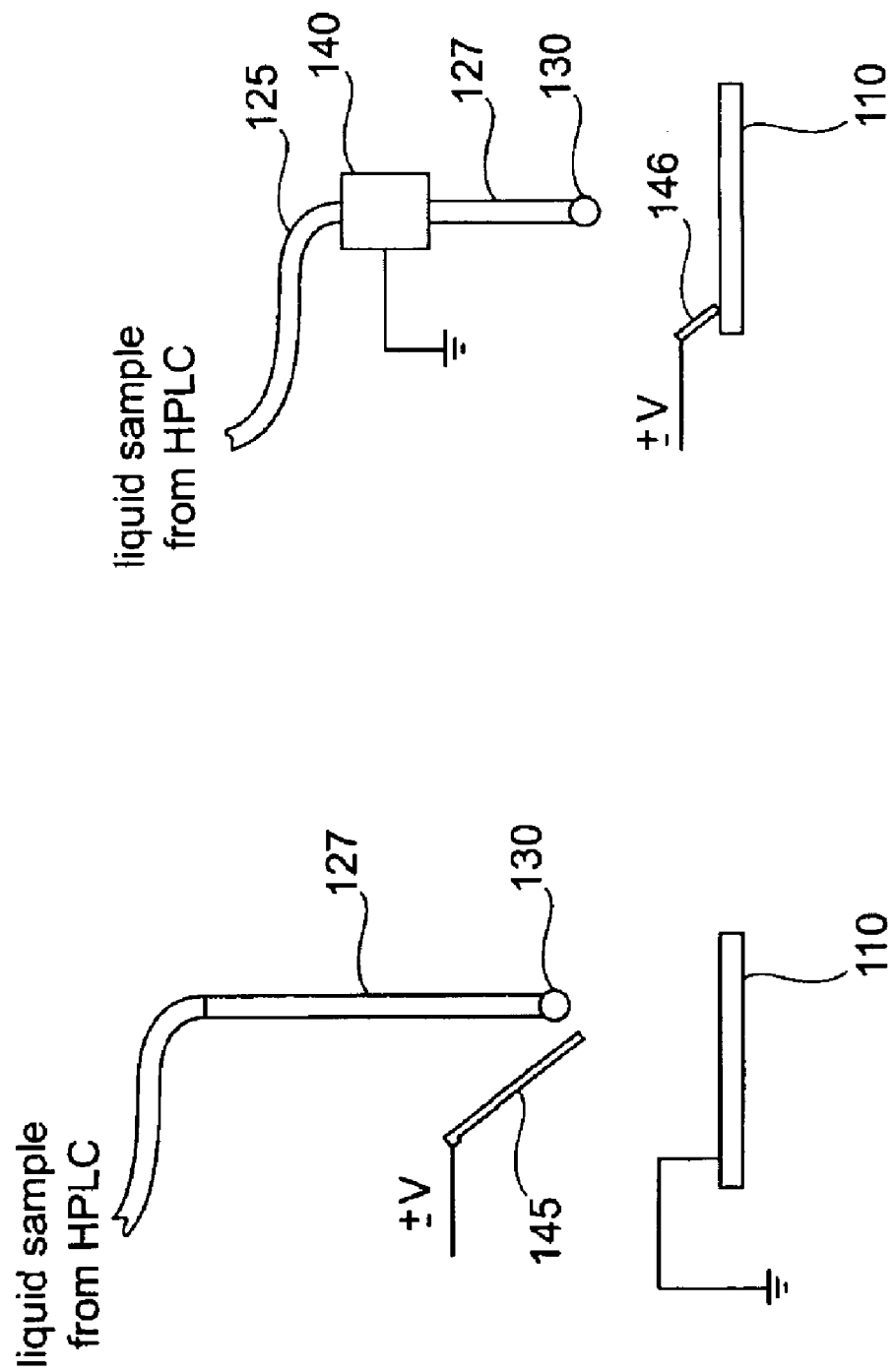

SAMPLE DEPOSITION METHOD AND SYSTEM

BACKGROUND OF THE INVENTION

1. Field of the Invention

The present invention relates to mass analysis. More particularly, the present invention relates to sample preparation and handling for mass spectrometry processes.

2. Description of the Related Art

Mass spectrometry (MS) is a method of mass analysis in which the chemical composition of a substance is identified by separating gaseous ions from the substance according to their mass-to-charge ratio. One type of ionization used in mass spectrometry is known as matrix-assisted laser desorption/ionization (MALDI). In MALDI, a sample and a matrix are co-crystallized from a liquid solution. The resulting co-crystal is irradiated with a laser, which causes the matrix molecules to absorb some of the incident energy. The absorbed energy causes some of the matrix and sample molecules to ionize and desorb into the gas phase. Once the sample molecules have been ionized and desorbed into the gas phase, they are amenable to analysis by mass spectrometry.

A sample that contains a mixture of chemical compounds is frequently purified prior to analysis by mass spectrometry. One method of purification is by liquid chromatography (LC), in which the mixture of compounds to be separated is dissolved in a liquid phase and the liquid phase is passed over a stationary phase contained in a chromatography column. Compounds that interact more strongly with the stationary phase are retained for a longer period of time on the column, which permits a mixture of compounds to be separated based upon differences in retention times.

One means of further separating compounds with differing retention times is to fractionate the liquid phase as it exits the chromatography column. The formation of a large number of small amounts of the liquid phase produced by an LC is known as fraction collection. The precision and speed with which fraction collection is performed is critical to achieving high-quality separation and analysis. In addition, after purification by LC, the liquid phase containing the sample molecules can be combined directly with a matrix solution to enable MS analysis. Hereinafter, a liquid refers to any solution containing either sample molecules or matrix molecules, or a mixture of both. A sample refers to a portion of a liquid that has been prepared and provided for analysis, such as by deposition on a sample plate.

Mass spectrometry analysis is currently being applied to increasingly complicated molecules and mixtures. In addition, advances in medicine, science and technology have created a growing demand for sophisticated analytical tools. This demand, in turn, requires the development of methods for the rapid and efficient preparation, purification and analysis of samples by mass spectrometry. Methods that enable the purification of large numbers of samples by LC and the analysis of large numbers of samples by MS have been developed independently. The demand for a rapid and efficient means to prepare and handle large numbers of LC fractions for analysis by MS, however, remains unmet.

Typically, systems for automated fraction collection include single-channel devices that use either a touch-down cycle or piezo-electric dispensers for depositing a liquid sample. Touch-down devices use mechanics for physically spotting a liquid droplet onto a fraction collection plate. These devices normally use a narrow capillary connected to a column that holds the liquid. A tip of the capillary physically contacts the fraction collection plate to deposit a droplet of the liquid.

Touch-down devices are notoriously prone to misalignment, wear and breakage. Also, preservation of the chromatographic resolution becomes an issue in touch-down collection when small fractions are collected. A significant portion of the liquid deposited in one spot can be carried over to the next spot by sticking to the capillary tip. To remedy carry-over, a make-up flow can be added by teeing-in additional solvent, or by applying a sheath flow, or both. These remedies increase the collected volumes so that a proportionately smaller sample fraction is carried over. However, the larger volumes dilute the sample concentration applied to the fraction collection plate, which, in turn, leads to lower sample densities and lower signal-to-noise in the signal generated by the mass spectrometer.

A piezo-electric dispenser is a type of non-contact liquid droplet deposition device, in which a piezo-electric element is used to apply a pulse-driven pressure to a dispenser. The pressure forces, or ejects, a droplet of liquid out through a nozzle in the dispenser. Samples deposited using piezo-electric devices typically exhibit reduced chromatographic resolution because a larger dead volume is required to eject the droplet, and the concentration of sample molecules to matrix molecules is correspondingly reduced. Further, problems exist with keeping the dispenser nozzle clean if matrix solvent contains larger amounts of non-volatile material. Application of a sheath flow is not possible in this case.

Other methods of micro deposition of LC samples include electrospray and streaking. Electrospray is a non-contact sample deposition process, which is sensitive to solvent composition and flow rate and which spreads the sample out over larger areas. Streaking is a contact form of deposition, which requires flash evaporation or freezing to preserve chromatographic resolution. Both electrospray and streaking processes are sensitive to solvent composition.

SUMMARY OF THE INVENTION

This invention provides a novel non-contact liquid droplet deposition system and method. Advantageously, the invention supports the preparation and handling of a larger number of sample targets, resulting in higher throughput, while providing flexibility by allowing greater control of liquid flow rates, sampling speed, and solvent composition. Additionally, a system and method in accordance with the invention provides for enhanced chromatographic resolution of samples produced using liquid chromatography without sacrificing throughput or flexibility.

The system and method according to embodiments of the invention provide a rapid, accurate, and efficient interface for depositing the output of up to eight liquid chromatography columns onto sample plates for analysis in a mass spectrometer. The system is flexible, permitting the deposition of samples at nearly any spacing, drop size, and solvent composition. Also, the samples can be deposited on a variety of sample plate materials, including both conducting and insulating materials. Non-contact deposition is achieved by a novel method of droplet desorption from fine capillary tips onto a sample plate through the application of a high voltage pulse to the sample plate, which generates an electric field between the sample plate and the capillary tip.

A method that embodies this invention includes positioning a sample plate below a liquid droplet, and applying an electric field between the liquid droplet and the sample plate.

The electric field polarizes the droplet. The polarized droplet experiences a force along the applied electric field and is pulled toward the sample plate.

Another method embodying this invention includes providing an array of liquid droplets at a distance above a positionable sample plate, and applying an electric field between the droplets and the sample plate. Under the influence of the electric field, the droplets move to target locations on the sample plate.

In another embodiment of the invention, a liquid droplet deposition system includes a holding mechanism, and an array of capillaries, held and positioned by the holding mechanism, wherein each capillary contains at least a portion of the liquid, and the array of capillaries provides one or more droplets of the liquid simultaneously. The system further includes a sample plate being positionable beneath the plurality of capillaries, and a power supply. The power supply connected to the capillaries and/or the sample plate for applying a voltage difference between the liquid and the sample plate.

In still yet another embodiment, a sample is formed of a number of successive droplet depositions, in which each deposition includes positioning a sample plate and a droplet-forming capillary such that the droplet-forming capillary is above a target location on the sample plate. A successive application of a plurality of voltage pulses pulls individual droplets to the same location on the sample plate.

BRIEF DESCRIPTION OF THE DRAWINGS

FIGS. 4A–4F show various methods of applying an electric field pulse in accordance with methods of the invention.

DETAILED DESCRIPTION OF THE PREFERRED EMBODIMENTS

Figure 1:
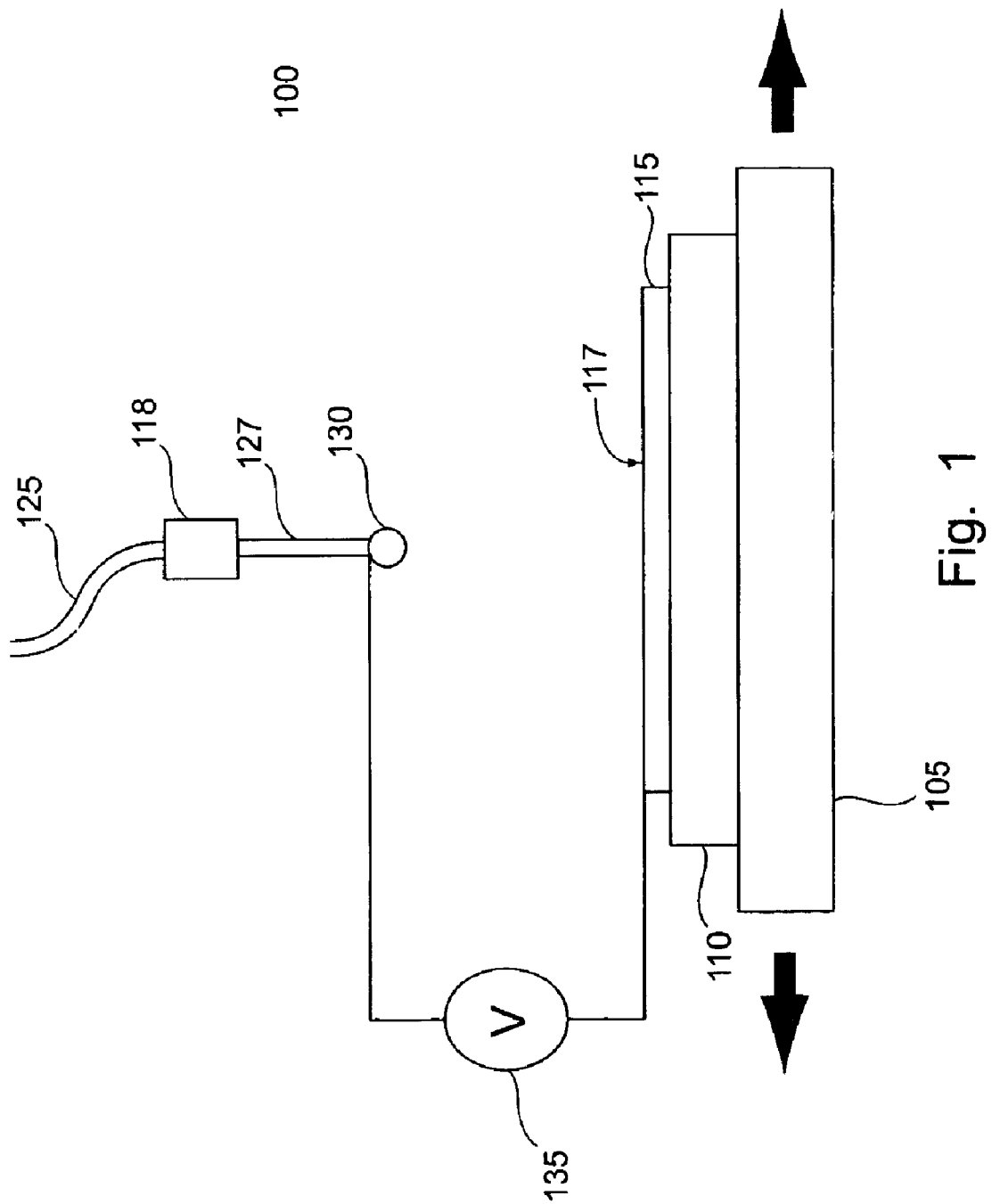
FIG. 1 is a simplified diagram of a liquid chromatography sample deposition system according to the invention.

FIG. 1 is a simplified diagram illustrating an LC MALDI sample deposition system 100 according to an embodiment of the present invention. The system 100 includes a motion table 105 and a controller 107. The motion table 105 is movable at least in a longitudinal direction shown, under direction of the controller 107. The motion table 105 may also move laterally, vertically, or rotationally.

A sample plate holder 110 rides on the motion table 105, preferably fixed to the motion table 105. In one embodiment, the sample plate holder 110 is a subassembly of the motion table 105. Other configurations are possible; for example the sample plate holder 110 and the motion table 105 may be provided as a single unit. The sample plate holder 110 provides a base to which a sample plate 115 can be clamped. One or more sample plate holders can be situated on the motion table 105, thus providing an accurate mechanism for accurately and reliably positioning one or more sample plates on the system 100. In one embodiment, the sample plate holder 110 uses a built-in spring to hold the sample plate, and one or more pins to accurately align the sample plate.

The sample plate 115 is formed of a rigid material and preferably has a planar upper surface 117. The upper surface 117 may include an array of wells or small divots in the upper surface 117, each for providing an anchor for a deposited portion of a sample. For example, each well can be an independently addressable target location embedded in the upper surface 117, suitable for micro-arraying applications. The sample plate 115 can be formed of a glass slide, a stainless steel plate.

The system 100 further includes a holding mechanism 118 adapted to hold one or more very small diameter columns 125, or capillaries. In one embodiment of the invention, the capillary 125 is connected to a high pressure liquid chromatography (HPLC) source that provides the HPLC liquid. The capillary 125 terminates at a capillary tip 127. The capillary tip 127 is connected to the capillary 125 at one end. The second end of the capillary tip 127 terminates to an open tip. The capillary tip 127 can be formed of a rigid or semi-rigid material such as metal, or silica glass. The material used for the capillary tip 127 may also depend on desired electrical characteristics of the material for transferring electric energy to the liquid provided therein, as explained in further detail below.

The liquid can include sample molecules, matrix molecules, or a mixture of sample molecules and matrix molecules. In one embodiment of the invention, the liquid is a sample solution containing sample molecules, and the matrix molecules are independently provided to the sample plate 115. Methods of applying matrix molecules to the sample plate 115 are known, including, but not limited to, depositing a matrix solution into individual wells formed in the upper surface 117, coating the entire upper surface 117 with a matrix composition, etc. The sample solution is mixed with the matrix solution or composition upon deposition to the sample plate 115. In another embodiment, the matrix solution is mixed with the sample solution in the capillary 125.

The capillary 125 and capillary tip 127 are adapted to receive a flowing portion 130 of the liquid. Preferably, the portion 130 of the liquid is a droplet. The droplet may have a controlled, adjustable size or volume, depending upon flow-rate through the capillary 125 and a desired size and density of the sample. Surface tension of the droplet suspends the droplet at the capillary tip 127 until the droplet is pulled away by the influence of an applied electric field. The portion 130 may be a collection of droplets, such as a spray, or even a continual stream of the liquid.

In accordance with the present invention, the system 100 includes a power supply 135. In one embodiment, the power supply 135 is a power supply in which the output voltage may be adjusted. The power supply 135 may also include electrodes that are connected to ground, or zero potential. The power supply 135 is configured to energize either the sample plate or the liquid, to create a potential difference between the liquid and the sample plate 117, either of which may also be pre-charged to a particular polarity.

In a preferred embodiment, a voltage pulse is provided to a liquid droplet 130, via the liquid, and to the sample plate 115. The application of this voltage pulse therefore creates a potential difference between the sample droplet 130 and the sample plate 115. The voltage pulse can be provided with any combination of electrical connections to the sample plate and the liquid, as will be illustrated below. The voltage level of this pulse can be set either manually or automatically, and the timing and duration of the voltage pulse can be controlled either manually or by software that runs the deposition system 100. Further, the power supply 135 is illustrated in FIG. 1 as having a connection to the sample plate 115 and the second, open end of the capillary tip 127. However, the actual physical connection from the power supply 135 may be made in any location that energizes either the sample plate or the liquid. Therefore, the present invention is not to be limited to the specific embodiment shown in FIG. 1.

The system 100 may additionally include a waste and wash plate, which are not shown in FIG. 1 for ease of explanation. The waste and wash plate allows cleaning of the capillary tips, from which samples are deposited, and provides a location for dropping extra sample before and/or after the sample plates are spotted with samples.

Figure 2:
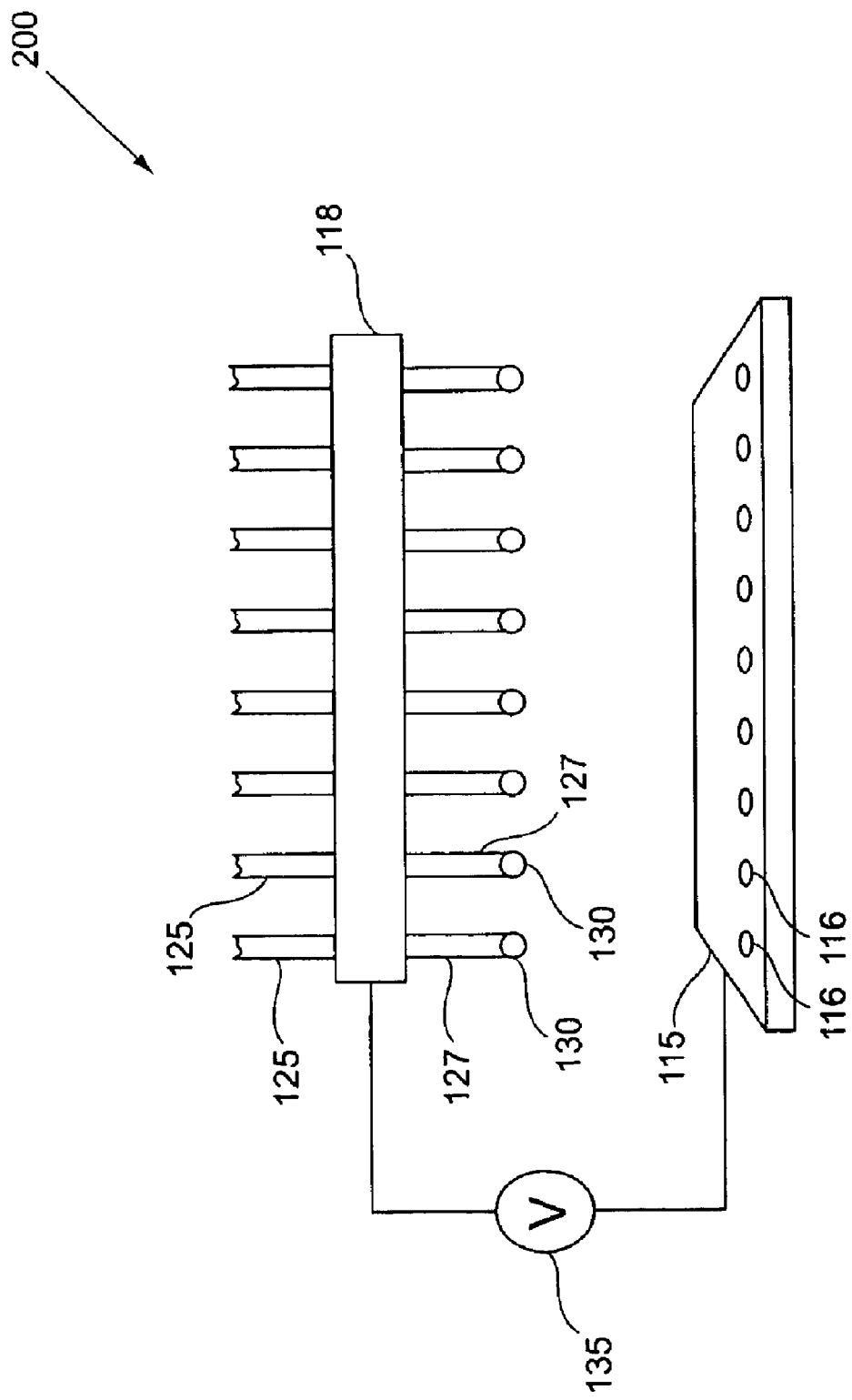
FIG. 2 illustrates an alternative embodiment of a sample deposition in accordance with the invention.

FIG. 2 illustrates a liquid droplet deposition system 200 according to another exemplary embodiment of the invention. The system 200 includes a holding mechanism 118 that is configured to hold an array of capillaries 125. Each capillary connects to a capillary tip 127, which bears a droplet 130 of the liquid. The sample plate 115 can be positioned to any desired location below the array of capillaries 125. The sample plate 115 may include an array of target locations 116, such as a well or an etched outline of a location, for example. The array of target locations 116 is illustrated as having only a single row, however those skilled in the art would recognize that multiple rows and columns of target locations 116 are possible, based in part on the desired spot size of the liquid droplet.

In the embodiment shown, eight capillaries 125 are held in position by the holding mechanism 118, however other numbers of capillaries may be provided by the system 200 of the present invention. Therefore, the number of capillaries 125 in the array of capillaries is not limited to any specific number. The number of capillaries may be limited by a number of target locations 116 of the sample plate 115 used in the system 200.

A power supply 135 is shown in the embodiment as connected between the holding mechanism 118 and the sample plate 115. As discussed, the connection may be made anywhere between the droplet and the sample plate. In an embodiment, a separate power supply may be provided for each capillary 125 and tip 127 for greater flexibility. In such an embodiment, the size and diameter of each liquid droplet generated by a particular capillary could be adjusted independently, and each droplet could be deposited on the sample plate independently of deposition from other capillaries. In another embodiment, the sample plate 115, or a substrate connected with the sample plate 115, is configured with an array of electrically addressable deposition sites or independent counter electrodes. The sites or electrodes could correspond to the target locations 116, for application of a differential voltage to the sample plate 115.

Figure 3C:
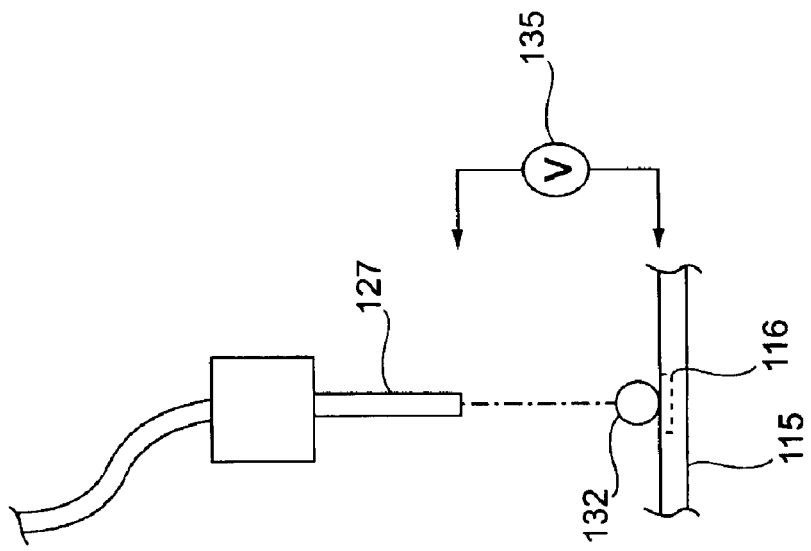
FIGS. 3A–3C are simplified diagrams of a deposition system to illustrate a liquid droplet deposition method according to the invention.
Figure 3B:
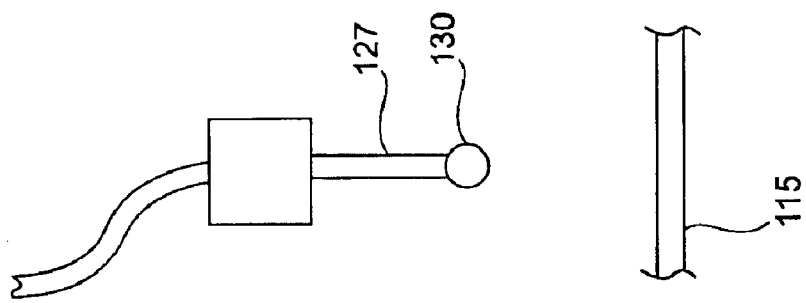
Figure 3A:
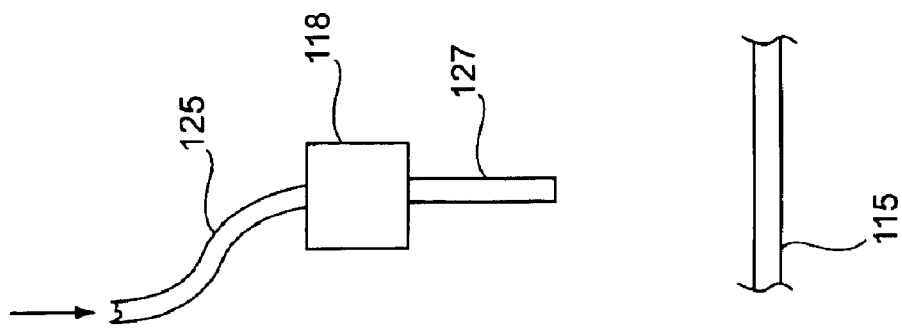

FIGS. 3A–3C are simplified diagrams of a system to illustrate a liquid droplet deposition method according to the invention. In FIG. 3A, at least a portion of a liquid is provided to a capillary 125. A holding mechanism 118 may be adjusted to position the capillary and a capillary tip 127 to a predetermined position. A sample plate 115 is moved into a position below the capillary tip 127.

Referring now to FIG. 3B, the flow of liquid through the capillary 125 forms a droplet 130 at an open end of the capillary tip 127. The size and contents of the droplet are controlled for a specific desired sample spot size and/or sample density. In one embodiment, each droplet has a volume of less than 10 microliters. Preferably, the volume of each droplet ranges between 100 and 200 nanoliters. As shown in FIG. 3C, a voltage differential 135 is applied between the droplet 130 and the sample plate 115, to attract the droplet 130 away from the capillary tip 127 to a target location 116 on the sample plate 115, and to form a sample spot 132.

A method according to the invention uses a high voltage pulse to create an electric field between the liquid sample and the sample plate. In one embodiment, a charge is applied to liquid droplets formed at the end of the capillary tips. In another embodiment, a charge is applied to the sample plate. The duration of the voltage pulses, and the interval between each pulse, are adjustable and controlled for desired throughput of sample deposition, and based in part on the size of the desired spot size.

FIGS. 4A–4E illustrate various methods of creating an electric field between a portion of the liquid and the sample plate. Turning first to FIG. 4A, there is illustrated a method of depositing a liquid droplet, whereby the sample plate 110 is connected to a positive or negative high voltage power supply. The voltage is applied in one or more pulses, which correspond to a time period in which deposition is to be made.

A liquid droplet, formed at the end of a capillary tip 127, can be neutrally charged, which, during application of a positive or negative voltage pulse to the sample plate, creates a potential difference between the liquid droplet and the sample plate. The potential difference between the liquid droplet and the sample plate generates an electric field along which the liquid droplet travels. In FIG. 4A, the liquid is grounded through a metal tee 140 that is a part of the holding mechanism 118, and the capillary tip 127 is formed of a nonconductive material such as fused silica glass. In FIG. 4B, the capillary tip 127 is made of a conductive material, such as metal, and is connected directly to ground.

FIG. 4C illustrates an alternative method for creating an electric field for depositing a sample. In this case, the capillary tip 127 is disposed in a sheath 128. The sheath 128 surrounds the capillary tip 127 along its length. A sheath liquid 129 is fed into the sheath 128. The sheath liquid 129 is polarized to a polarity that is opposite the polarity of a voltage pulse to be applied to the sample plate 110. Alternatively, the sheath liquid 129 may have a neutral polarity or a ground potential. The sheath liquid contacts a liquid droplet at the end of the capillary tip 127.

An electrode may also be used to apply a charge to either the liquid or the sample plate, as shown in FIGS. 4D and 4E. In FIG. 4D, the sample plate 110 is grounded, and an electrode is placed in contact with the liquid droplet 130 for a short duration. The electrode may be persistently connected to the capillary tip 127, or physically movable to touch the liquid directly if the capillary tip is formed of nonconductive material. Further, the electrode may be switchably coupled to the liquid or droplet according to a desired interval. In FIG. 4E, the liquid is grounded according to any method, including those methods mentioned above. An electrode is then coupled to the sample plate 110 to apply a high voltage pulse. As discussed, the electrode can include a switch for physical connection to the sample plate when a voltage pulse is needed.

Figure 4F:
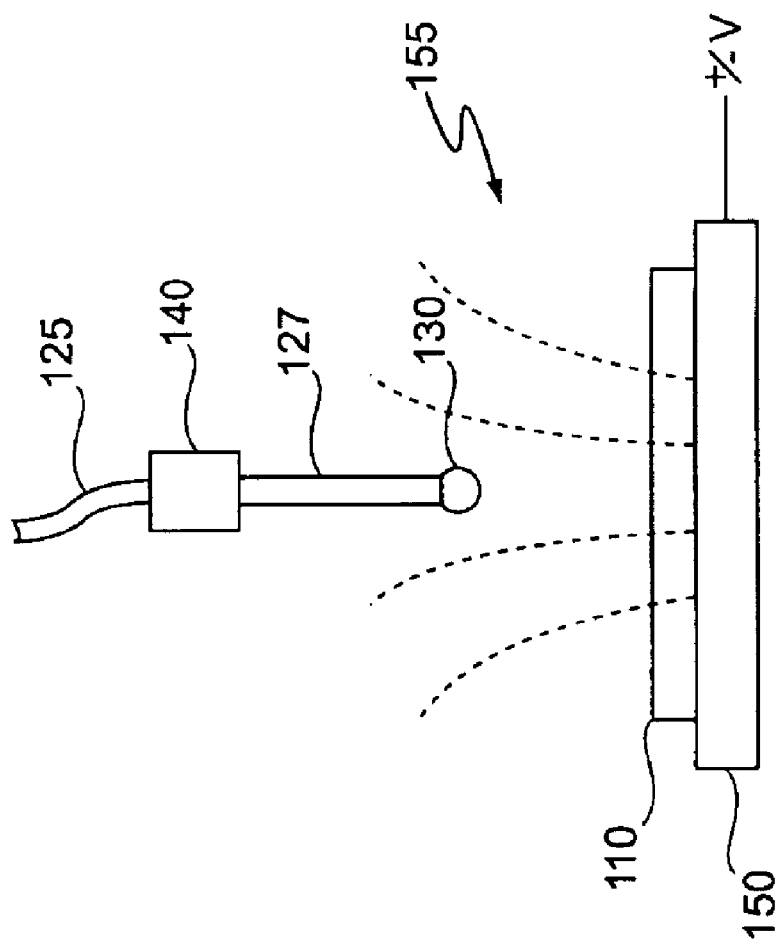

FIG. 4F illustrates another embodiment of a system and method according to the invention. The sample plate 110 is mounted over an electrode plate 150, which is connected to a voltage source. Preferably, the voltage source is configured to apply a voltage pulse to the electrode plate 150 at predetermined intervals, and for a predetermined adjustable duration. In this embodiment and the other aforementioned embodiments, the duration of the voltage pulses ranges from 100–300 milliseconds, and is preferably about 200 milliseconds. However, other pulse durations may be used without departing from the scope of the invention. For example, application of a pulse of duration longer than 300 milliseconds can achieve an electrospray of sample to the sample plate, if desired. In this embodiment and the other aforementioned embodiments, the distance between the sample droplet and the sample plate ranges from one to ten millimeters, and is preferably about five millimeters. However, other distances may be used without departing from the scope of the present invention.

The voltage difference ranges from 500 to 3000 volts. However, other voltage differences may be used without departing from the scope of the invention. The charged electrode plate 150 creates an electric field, shown generally in the simplified diagram of FIG. 4F. The droplet 130 formed at the end of the capillary tip 127 is polarized according to the electric field 155, and is then attracted toward the electrode plate 150 to the sample plate 110, along the electric field 155 path.

In another exemplary embodiment, a liquid portion is deposited to a sample plate as a succession of droplets pulled to a single location on the sample plate. According to this embodiment, a target location on the sample plate is positioned with respect to a liquid to be deposited. A succession of electric fields are generated, preferably by a number of voltage pulsed, which attract a like number of liquid droplets to the target location. This embodiment improves resolution of the deposited sample solution, and reduces back-mixing of molecules in the droplets to the liquid.

Those having skill in the art will recognize that the present invention for depositing one or more liquid droplets to the surface of a sample plate is not limited to the specific embodiments described herein. Other systems and methods may be used within the scope of the invention. Further, the specific embodiments of the systems and methods described herein are merely exemplary, and therefore values and ranges of values may occur that are different than those presented here for example, and still be within the scope of the present invention. Therefore, this invention is to be limited only by the following claims, which include all such embodiments and modifications when viewed in conjunction with the above specification and accompanying drawings.

What is claimed is:

1. A liquid droplet deposition system, comprising:
   a holding mechanism;
   a plurality of capillaries, held by the holding mechanism;
   a sample plate holder positioned beneath the plurality of capillaries;
   a high pressure liquid chromatography (HPLC) source in fluid communication with the capillaries, which HPLC source causes a liquid to flow through and form a droplet at an end of each capillary; and
   a power supply that includes a voltage source and is configured to generate an electric field between each capillary and a sample plate by applying; a) a charge to the sample plate when said sample plate is placed on the sample plate holder, and b) a ground connection to the droplet of liquid after said droplet forms at the end of the capillary,
   wherein when the electric field is generated, the droplet is pulled to the sample plate along the electric field.

2. The liquid droplet deposition system of claim 1, wherein each capillary comprises:
   a holding column for containing a liquid from which the liquid droplet is formed; and
   a capillary, connected at a first end to the holding column, and including an open tip at a second end for providing the droplets.

3. The liquid droplet deposition system of claim 1, wherein the sample plate holder is movable.

4. The liquid droplet deposition system of claim 1, further comprising a motion table upon which is situated one or more sample plate holders.

5. The liquid droplet deposition system of claim 1, further comprising means for moving a sample plate that is positioned on the sample plate holder to a target position.

6. The liquid droplet deposition system of claim 1, wherein the system comprises an electrode plate through which the charge is applied indirectly to the sample plate.

7. The liquid droplet deposition system of claim 1, wherein the system comprises an electrical connection which grounds a liquid droplet at the tip of the capillary.

8. The liquid droplet deposition system of claim 1, wherein the system comprises electrical connections between a power supply and each of a plurality of capillaries.

9. The liquid droplet deposition system of claim 1, wherein the power supply further includes a ground connection for grounding the liquid droplet.

10. The liquid droplet deposition system of claim 1, wherein the power supply includes a voltage source.

11. The liquid droplet deposition system of claim 1, further comprising a controller.

12. The liquid droplet deposition system of claim 1, wherein the capillary is connected to a liquid chromatography column.

13. The liquid droplet deposition system of claim 1, wherein the flow rate through a capillary regulates the size of the liquid droplet.

14. A liquid droplet deposition system, comprising:
    a holding mechanism;
    a plurality of capillaries, held by the holding mechanism;
    a sample plate holder positioned beneath the plurality of capillaries; and
    a power supply that includes a voltage source and is configured to generate an electric field between each capillary and a sample plate by applying: a) a charge to the sample plate when said sample plate is placed on the sample plate holder, and b) a ground connection to a droplet of liquid after said droplet is formed at an end of the capillary, wherein the system comprises electrical connections between the power supply and each region of an array of sample deposition sites, thereby allowing the independent application of a charge to different parts of a sample plate that is positioned on the sample plate holder,
    wherein the electric field is generated, the droplet is pulled to the sample plate along the electric field.

15. A liquid droplet deposition system, comprising:
    a holding mechanism;
    a plurality of capillaries, held by the holding mechanism;
    a sample plate holder positioned beneath the plurality of capillaries;
    a high pressure liquid chromatography (HPLC) source in fluid communication with the capillaries, which HPLC source causes a liquid to flow through and form a droplet at an end of each capillary; and a power supply that includes a voltage source and is configured to generate an electric field between each capillary and a sample plate when said sample plate is placed on the sample plate holder, wherein when the electric field is generated, the droplet is pulled to the sample plate along the electric field.

16. The liquid droplet deposition system of claim 15, wherein the electric field is generated by applying: a) a ground connection to the sample plate, and b) a charge to the droplet of liquid after said droplet forms at the end of the capillary.

17. The liquid droplet deposition system of claim 15, wherein the electric field is generated by applying: a) a charge to the sample plate, and b) a ground connection to the droplet of liquid after said droplet forms at the end of the capillary.

18. The liquid droplet deposition system of claim 15, wherein the system further comprises at least one liquid chromatography column in fluid communication with at least one of the capillaries.

19. The liquid droplet deposition system of claim 15, wherein the flow rate through a capillary regulates the size of the liquid droplet.

* * * * *